US009411775B2

(12) United States Patent
Sharp et al.

(10) Patent No.: US 9,411,775 B2
(45) Date of Patent: Aug. 9, 2016

(54) IWARP SEND WITH IMMEDIATE DATA OPERATIONS

(71) Applicant: Intel Corporation, Santa Clara, CA (US)

(72) Inventors: Robert O. Sharp, Round Rock, TX (US); Donald E. Wood, Austin, TX (US); Kenneth G. Keels, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 269 days.

(21) Appl. No.: 13/949,450

(22) Filed: Jul. 24, 2013

(65) Prior Publication Data

US 2015/0032835 A1    Jan. 29, 2015

(51) Int. Cl.
G06F 15/167    (2006.01)

(52) U.S. Cl.
CPC .................................... *G06F 15/167* (2013.01)

(58) Field of Classification Search
CPC ..... G06F 15/167; G06F 13/28; H04L 69/163; H04L 69/161; H04L 45/00
See application file for complete search history.

(56) References Cited

U.S. PATENT DOCUMENTS

| 7,765,317 | B1* | 7/2010 | Micalizzi, Jr. | 709/232 |
|---|---|---|---|---|
| 2002/0144001 | A1* | 10/2002 | Collins et al. | 709/250 |
| 2005/0149817 | A1* | 7/2005 | Biran et al. | 714/758 |
| 2006/0259661 | A1* | 11/2006 | Feng et al. | 710/39 |
| 2010/0183024 | A1* | 7/2010 | Gupta | 370/463 |
| 2012/0287944 | A1* | 11/2012 | Pandit et al. | 370/474 |

* cited by examiner

*Primary Examiner* — Umar Cheema
*Assistant Examiner* — Anh Nguyen
(74) *Attorney, Agent, or Firm* — Law Office of R. Alan Burnett, P.S.

(57) ABSTRACT

Apparatus, methods and systems for supporting Send with Immediate Data messages using Remote Direct Memory Access (RDMA) and the Internet Wide Area RDMA Protocol (iWARP). iWARP logic in an RDMA Network Interface Controller (RNIC) is configured to generate different types of Send with Immediate Data messages, each including a header with a unique RDMA opcode identifying the type of Send with Immediate Data message, and send the message to an RDMA remote peer using iWARP implemented over an Ethernet network. The iWARP logic is further configured to process the Send with Immediate Data messages received from the RDMA remote peer. The Send with Immediate Data messages include a Send with Immediate Data message, a Send with Invalidate and Immediate Data message, a Send with Solicited Event (SE) and Immediate Data message, and a Send with Invalidate and SE and Immediate Data message.

26 Claims, 11 Drawing Sheets

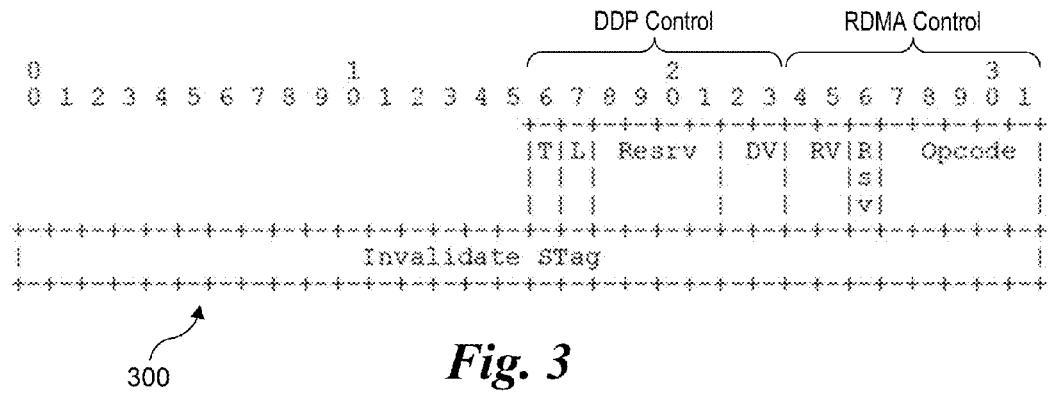

Fig. 3

| RDMA Opcode | Message Type | Tagged Flag | STag and TO | Queue Number | Invalidate STag | Message Length Communicated between DDP and RDMAP |
|---|---|---|---|---|---|---|
| 01000b | Immediate Data | 0 | N/A | 0 | N/A | Yes |
| 01001b | Immediate Data with SE | 0 | N/A | 0 | N/A | Yes |
| 10011b | Send with Immediate Data | 0 | N/A | 0 | N/A | Yes |
| 10100b | Send with Invalidate and Immediate Data | 0 | N/A | 0 | Yes | Yes |
| 10101b | Send with SE and Immediate Data | 0 | N/A | 0 | N/A | Yes |
| 10110b | Send with Invalidate and SE and Immediate Data | 0 | N/A | 0 | Yes | Yes |

Fig. 4

| RDMA Message OpCode | Message Type | RDMA Header Used | ULP Message allowed in the RDMA Message |
|---|---|---|---|
| 01000b | Immediate Data | Immediate Data Header | No |
| 01001b | Immediate Data with SE | Immediate Data Header | No |
| 10011b | Send with Immediate Data | Immediate Data header in the last ULPDU | Yes |
| 10100b | Send with Invalidate and Immediate Data | Immediate Data header in the last ULPDU | Yes |
| 10101b | Send with SE and Immediate Data | Immediate Data header in the last ULPDU | Yes |
| 10110b | Send with Invalidate and SE and Immediate Data | Immediate Data header in the last ULPDU | Yes |

IWARP SEND WITH IMMEDIATE DATA OPERATIONS

FIELD OF THE INVENTION

The field of invention relates generally to computer systems and networking and, more specifically but not exclusively relates to techniques for implementing Send with immediate data operations for iWARP.

BACKGROUND INFORMATION

Remote Direct Memory Access (RDMA) is a direct memory access mechanism that enables a computer to access memory from another computer without involving the computers' operating systems. RDMA supports zero-copy networking by enabling a network adapter to transfer data directly to or from application memory, eliminating the need to copy data between application memory and the data buffers in the operating system. Such transfers require no work to be done by central processing units (CPUs), caches, or context switches, and transfers continue in parallel with other system operations. When an application performs an RDMA Read or Write request, the application data is delivered directly to the network (via appropriate hardware), reducing latency and enabling fast message transfer.

Current RDMA-enabled network adapters such as Internet Wide Area RDMA Protocol (iWARP) RDMA Network Interface Controllers (RNICs) or InfiniBand HCAs (Host Channel Adapters) allow applications to communicate with hardware directly from the application address space. This is enabled by supporting numerous hardware queues—Send Queues (SQ) and Receive Queues (RQ) that can be mapped and directly accessed from the application address space through use of Memory Mapped Input/Output (MMIO) in the RNIC or HCA. Every time an application posts a new transmit or receive work request (WR), this request is added to the respective SQ or RQ by the user space library supplied by the hardware provider.

On one level, the RDMA architecture is designed to provide an abstraction between RDMA interfaces and the underlying network technology (e.g., Ethernet and InfiniBand). For example, a Remote Direct Memory Access Protocol (RDMAP) is designed to operate over the Direct Data Placement Protocol (DDP), which in turn interfaces (with other lower layers) to the RNIC or HCA. Ideally, the RDMAP should expose a consistent interface to applications in a network-technology agnostic manner, thereby enabling the same application to implement RDMA on any network technology that supports RDMA. However, various network technology-specific extensions have been added to various RDMA specifications over the years, resulting in some level of fragmentation.

One example of such fragmentation concerns support for Immediate Data. iWARP was originally specified without operations that included Immediate Data. This created an application-visible difference between iWARP and other RDMA technologies such as InfiniBand, which support data transfers using Immediate Data. An Internet Engineering Task Force (IETF) draft was started that added Immediate Data and Immediate Data with Solicited Event operations. While this approach can be used to address RDMA Write with Immediate Data, it does not fully remove the application specific differences.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3 is diagram depicting DDP control and RDMAP control fields having a format that has been modified to support RDMA Immediate Data messages having unique opcodes;

FIG. 4 is a table defining the values of the RDMA opcode field used for the RDMA Messages relating to Immediate Data operations, according to one embodiment.

FIG. 5 is a table defining which RDMA Headers are used for each new RDMA Immediate Data message and which RDMA Immediate Data messages are allowed to carry ULP payload (data);

DETAILED DESCRIPTION

Embodiments of apparatus, methods, and systems for supporting Send with Immediate Data messages using the iWARP are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspect of the embodiments disclosed herein, techniques are provided for implementing Send with Immediate Data messages and associated operations using iWARP. Send with Immediate Data messages allow the Upper Layer Protocol (ULP) at the sender to provide a small amount of data (the immediate data) following one or more DDP segments containing Send ULP data or using a standalone Send with Immediate Data message that does not include Send ULP data. Additionally, the immediate data is written to a completion queue entry upon receipt of a Send with Immediate Data message.

Figure 1:
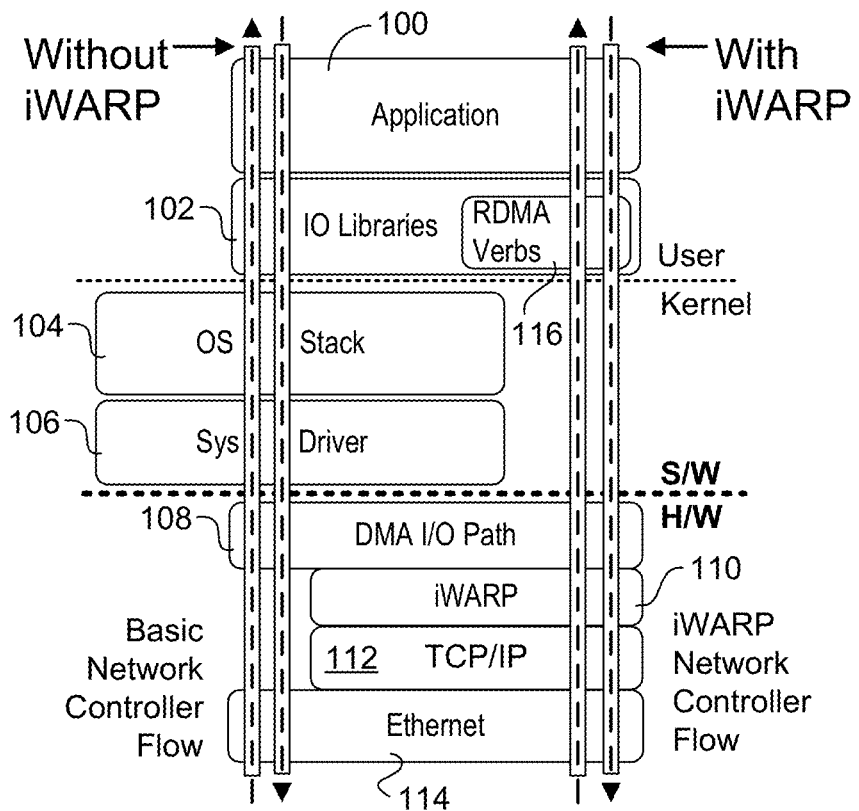
FIG. 1 is a diagram illustrating a comparison between a conventional network data transfer and an iWARP data transfer.

To better understand and appreciate aspects and advantages of the embodiments, the following primer on basic iWARP technologies is provided. The diagram of FIG. 1 illustrates a comparison between a conventional network data transfer (labeled without iWARP) and an iWARP network data transfer. The blocks illustrated in FIG. 1 include an application layer 100, Input/Output (IO) libraries 102, an Operating System (OS) network stack 104, a system driver 106, a DMA I/O Path 108, an iWARP layer 110, TCP/IP layers 112, and an Ethernet layer 114. As illustrated, each of application layer 100, IO libraries 102, OS network stack 104, and system driver 106 comprise software entities, while the entities below the S/W-H/W line comprise hardware-based entities.

Under the conventional (i.e., without iWARP) approach, packet processing is performed via the OS network stack 104, which resides in the OS kernel. This requires use of both OS kernel resources and processor core cycles. In contrast, RDMA (and iWARP) enables direct memory access to memory on a remote system in a manner that bypasses the system CPU and operating system (for fast-path operations). RDMA supports zero-copy networking by enabling an RNIC to transfer data directly to or from application memory (i.e., a memory space in system memory allocated to an application) that is maintained separate for kernel memory used by an operating system, eliminating the need to copy data between application memory and data buffers in kernel memory employed by the operating system. This is facilitated via DMA operations under which a DMA engine on an RNIC is enabled to directly write to and read from data buffers in system memory that have been allocated to the RNIC. For iWARP-specific RDMA implementations, this is further facilitated through use iWARP layer 110 at the hardware level and RDMA Verbs 116 in OS user space.

The RDMA Consortium has published the RDMA Protocol Verbs Specification that describes the behavior of RNIC hardware, firmware, and software as viewed by the RNIC host (i.e., computer system or platform in which an RNIC is implemented). The behavior description is specified in the form of an RNIC Interface and a set of RNIC Verbs. An RNIC Interface defines the semantics of the RDMA services that are provided by an RNIC that supports the RNIC Verb Specification, and can be implemented through a combination of hardware, firmware, and software. A Verb is an operation that an RNIC Interface is expected to perform. The current draft RDMA Verbs specification is published at http://tools.ietf.org/html/draft-hilland-rddp-verbs-00. As used herein below, the specification is referred to as RDMA Verbs.

RDMA Verbs defines a mechanism for allocating memory called Memory Registration. Memory registration enables access to a Memory Region by a specific RNIC. Binding a Memory Window enables the specific RNIC to access memory represented by that Memory Window. Memory registration provides mechanisms that allow consumers (i.e., the applications that employ RDMA for data transfers) to describe a set of virtually contiguous memory locations or a set of physically contiguous locations to the RNIC in order to allow the RNIC to access either as a virtually contiguous buffer using a Steering Tag (STag) and a Tagged Offset. Memory registration provides the RNIC with a mapping between a STag and Tagged Offset and a Physical Memory Address. It also provides the RNIC with a description of the access control associated with the memory location. The set of memory locations that have been registered are referred to as a Memory Region. Before an RNIC can use a Memory Region, the resources associated with the Memory Region are allocated and the Memory Region is registered with the RNIC. This phase of operation is associated with RDMA control path operations, which involves use of the OS kernel and RNIC driver.

Under a conventional use of RDMA, the RDMA components at both ends of an RDMA communication channel (i.e., components at a sending and a receiving computer platform, commonly referred to as local and remote RDMA peers) allocate (or request allocation from the OS of) buffers in system memory for a given application. A data transfer between applications is performed by copying data in a source buffer in the sender's computer to a destination (sink) buffer on the receiver's computer.

Through implementation of a memory registration scheme, buffers used for an RDMA data transfer are registered with the RNICs prior to initiating the actual data transfer. This is facilitated, in part, through use of work requests (WRs). Each WR defines: 1) the data transfer operation type (Send, Receive, RDMA Read, RDMA Write); 2) The source buffer for Sends, RDMA Reads and RDMA Writes; and 3) The destination buffer for Receives, RDMA Reads and RDMA Writes. In turn, each of the source and destination buffers has an explicitly defined location (i.e., address range) within a memory region. After registration, these buffers are referred to as "tagged buffers" and are identified by unique STags, as discussed above.

Figure 2:
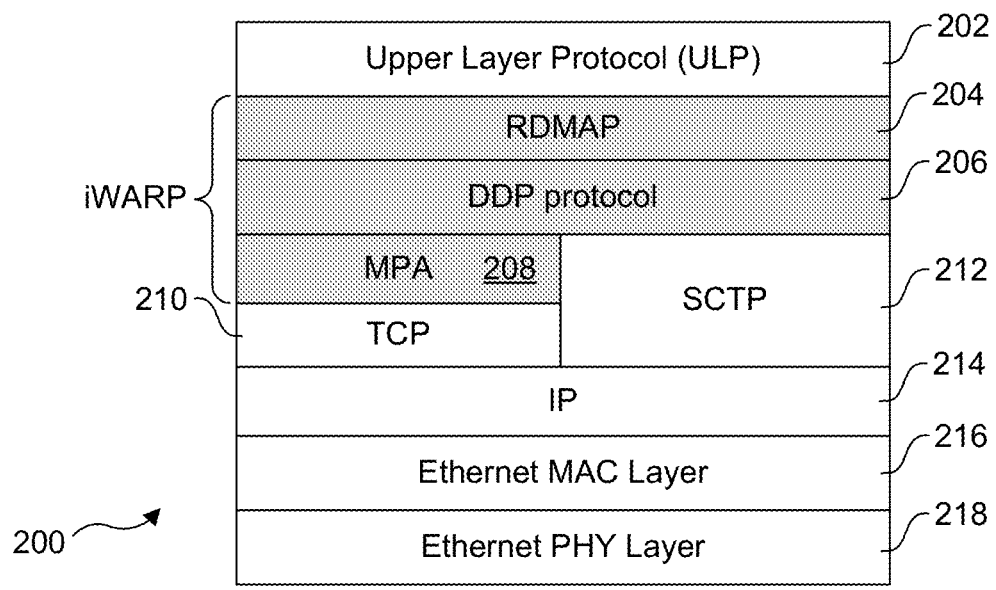
FIG. 2 is a diagram illustrating an iWARP reference model.

FIG. 2 shows an illustration of an iWARP reference model 200. The model includes an Upper Layer Protocol layer 202, an RDMAP layer 204, a DDP protocol layer 206, a Marker Protocol Data Unit (PDU) Alignment (MPA) layer 208, a TCP layer 210, a Stream Control Transmission Protocol (SCTP) layer 212, an IP layer 214, an Ethernet MAC layer 216, and an Ethernet PHY layer 218. Details for implementing RDMAP operations are provided in IETF RFC 5040, RDMA Protocol Specification. Details for implementing DPP operations are provided in IETF RFC 5041, DDP Protocol Specification. Details for implementation of MPA layer 208 are provided in IETF RFC 5044, Marker PDU Aligned Framing for the TCP Specification. MPA is designed to work as an adaptation layer between TCP and the DDP protocol.

New iWARP Send with Immediate Data Messages and Operations

The original IEFT standards for iWARP Remote Direct Data Placement (RDDP) defined in RFC 5040 did not include the following opcodes:

Send with Immediate Data

Send with Solicited Event with Immediate Data

Send with Invalidate with Immediate Data

Send with Invalidate with Solicited Event with Immediate Data

These operations are visible to applications and end up causing applications to be aware of the RDMA technology that is in use. The current solution proposed in the IETF to address this issue is to provide only an Immediate Data opcode. This solution is lacking in that it cannot distinguish each of the above listed opcodes and also cannot be used with Send operations because Send operations would generate two completions at the system level instead of one, which is not acceptable.

In accordance with aspects of the embodiments now disclosed, new iWARP opcodes are disclosed for implementing Send with Immediate Data messages and related operations. This includes new iWARP opcodes for the following new iWARP RDMA messages 1) Send with Immediate Data; 2) Send with Invalidate and Immediate Data; 3) Send with SE and Immediate Data; and 4) Send with Invalidate and SE and Immediate Data. This allows proper reporting of the operation type at the remote peer, as well as enabling Immediate Data operations that were not possible with the current approach. The new Send with Immediate Data messages are collectively referred to as Send with Immediate Data variants herein.

In further detail, the basic concept is to add operations to the iWARP specification that include Send with Immediate Data rather than adding a generic immediate operation. One rule for the new Send with Immediate Data operations is that the Immediate Data is contained in the last or only DDP Segment with the L bit set as defined in IETF RFC 5041. The L bit indicates that the DDP Segment is either the Last or Only DDP Segment of an iWARP message. Accordingly, for the Send with Immediate Data message variants, the L bit will be set to 1 only in the DDP Segment containing Immediate Data instead of the last DDP Segment that carries non-immediate data (as is still the case in iWARP Send message variants that do not include Immediate Data). An additional rule is that the only data that is allowed in the DDP Segment with the L bit set is the Immediate Data itself.

The embodiments herein define the unique operations above in addition to the existing Immediate Data operation currently under discussion in the IETF. The rules for supplying immediate data are the following:

All DDP Segments of the Send with Immediate Data variants carry the new opcodes.

In the Send with Immediate Data variants including non-immediate data, the L-bit will no longer be set on the last DDP segment carrying non-immediate data.

An additional DDP Segment with the Immediate Data will be sent that carries only the Immediate Data and has the L bit set.

If only immediate data is included with the Send with Immediate Data variant operation, the corresponding iWARP message will comprise a single DDP Segment that includes only Immediate Data and has the L bit set.

In addition, in the Send with Immediate Data variants, when the L-bit is set the MO field is set to the message length; for Send with Immediate Data variants that only include Immediate Data, the MO value is 0.

The control information of RDMA Messages is included in DDP protocol [RFC5041] defined header fields, with the following new formats. Four new RDMA Messages relating to Send with Immediate Data carry additional RDMAP headers. The Send with Immediate Data, Send with Solicited Event and Immediate Data, Send with Invalidate and Immediate Data, and Send with Invalidate and Solicited Event and Immediate Data operations include 8 bytes of data following the RDMAP header.

The RDMA Messages use all 8 bits of the RDMAP Control Field. The first octet reserved for ULP use in the DDP Protocol is used by the RDMAP to carry the RDMAP Control Field. The ordering of the bits in the first octet are shown in RDMA header 300 of FIG. 3, which depicts the format of the DDP Control and RDMAP Control fields, in the style and convention of RFC 5040. The fields include a 1-bit tagged (T) flag, a 1-bit Layer (L) flag (aka L-bit), a 4-bit reserved field, a DDP version (DV) field, an RDMA version (RV) field, a 1-bit reserved field, a 5-bit opcode, and an Invalidate STag field. In the illustrated embodiment, the beginning of the DDP Control information is offset by 16 bits to accommodate the MPA header.

Table 400 of FIG. 4 defines the values of RDMA opcode field used for the RDMA Messages relating to Immediate Data operations, according to one embodiment. The opcode field has been extended one additional bit (relative to the field defined in RFC 5040, a new additional bit (at bit 27) is added) to accommodate the additional opcodes. Existing opcodes defined in RFC 5040 set the additional bit (bit 27) to a 0. Table 400 also defines when the STag, Tagged Offset, and Queue Number fields must be provided for the RDMA Immediate Data Messages, according to one embodiment.

In further detail, the RDMA Immediate Data Messages shown in table 400 include an Immediate Data Message, an Immediate Data with Solicited Event (SE) Message, a Send with Immediate Data Message, a Send with Invalidate and Immediate Data Message, a Send with SE and Immediate Data Message, and a Send with Invalidate and SE and Immediate Data Message. For each of the foregoing, Immediate Data corresponds to a small fixed size portion of data sent from the Data Source to a Data Sink in a corresponding Immediate Data Message.

In one embodiment the following conditions are met for RDMA Immediate Data Messages. First, the RDMA Version (RV) field is set to 10*b*. Second, the opcode field shown in table 400 is used. Third, the Invalidate STag is set to zero by the sender, and is ignored by the receiver.

Table 500 of FIG. 5 defines which RDMA Headers are used on each new RDMA Immediate Data message and which RDMA Immediate Data messages are allowed to carry ULP payload (data). As shown, a ULP message is allowed in the RDMA message for each of the Send with Immediate Data variants, while it is not permitted for each of the Immediate Data and Immediate Data with SE variants.

The Send with Immediate Data operations are used in conjunction with a Send operation to improve ULP processing efficiency by allowing 8 bytes of Immediate Data to be delivered within a Send message. For these Send with Immediate Data operations, the following are the interactions between the RDMAP Layer and the ULP. At the Data Source, the ULP passes to the RDMAP Layer eight bytes of ULP Immediate Data. When the Immediate Data operation Completes, an indication to the completion results. At the Data Sink, if the Immediate Data operation is Completed successfully, the RDMAP Layer passes the following information to the ULP Layer: 8 bytes of Immediate Data; and an Event, if the Data Sink is configured to generate an Event. If the Immediate Data operation is Completed in error, the Data Sink RDMAP Layer will pass up the corresponding error information to the Data Sink ULP and send a Terminate Message to the Data Source RDMAP Layer. The Data Source RDMAP Layer will then pass up the Terminate Message to the ULP.

Figure 6A:
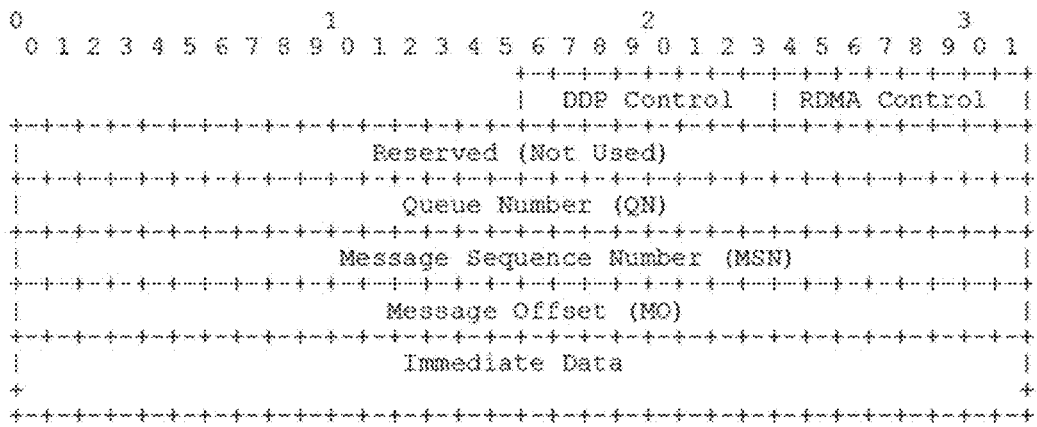
FIG. 6a is a data structure illustrating the format of a DDP segment containing immediate data, according to one embodiment.
Figure 6B:
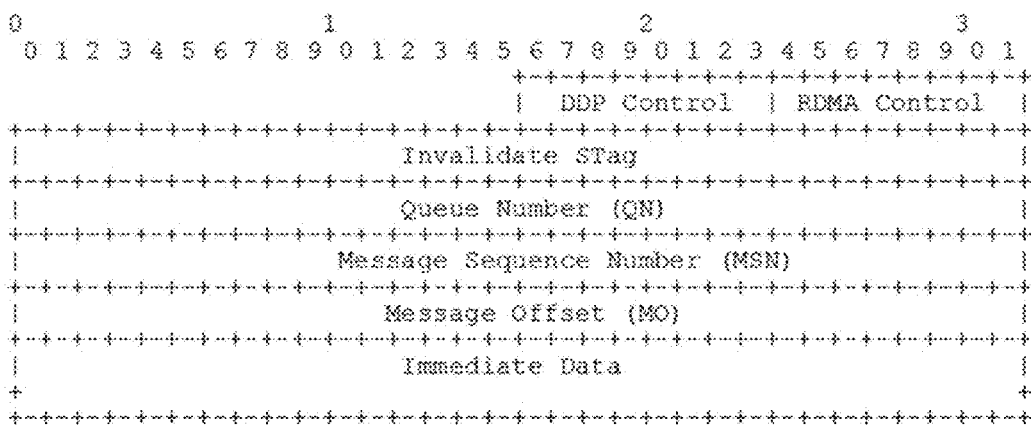
FIG. 6b is a data structure illustrating the format of a DDP segment containing immediate data and used for Send with Invalidate and Immediate Data variants, according to one embodiment.

The Send with Immediate Data message variants disclosed herein include a DDP segment containing the DDP header format shown in FIG. 3 followed by a Queue Number (QN) field, a Message Sequence Number (MSN) field, and a Message Offset (MO) field, followed by 8 bytes of immediate data, as shown in diagram 600 of FIG. 6a. For Send with Invalidate and Immediate Data message variants, the DDP header format depicted in diagram 650 of FIG. 6b is used. The RDMAP layer passes to the DDP layer the RDMAP Control Field and the 8 bytes of Immediate Data. The first 8 bytes of the data following the DDP header contains the immediate data. Ordering and completion rules for Immediate Data are the same as those for a Send operation as described in section 5.5 of RFC 5040.

Figure 7A:
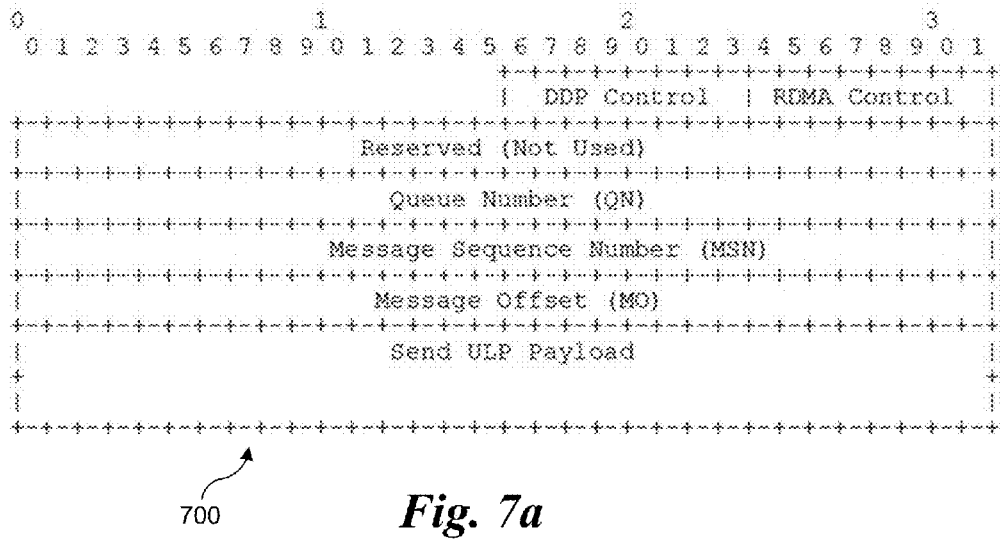
FIG. 7a is a data structure illustrating the format of a DDP segment containing Send ULP data that is employed in a Send with Immediate Data message and a Send with SE and Immediate Data message, according to one embodiment.

Diagram 700 of FIG. 7a depicts a DDP segment format for a DDP segment in a Send with Immediate Data message variant that includes Send ULP data and that precedes the DDP segment including the immediate data shown in FIG. 6. This format is similar to a conventional Send DDP segment, except for the new RDMAP control field and Reserved field. As with conventional Send messages, the Send ULP Payload may have a variable length.

Figure 7B:
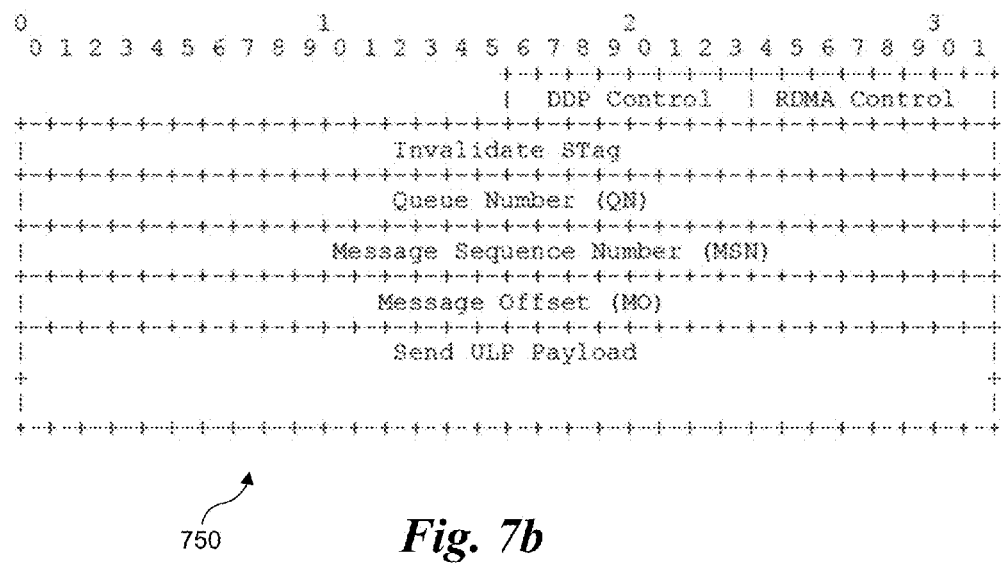
FIG. 7b is a data structure illustrating the format of a DDP segment containing Send ULP data that is employed in a Send with Invalidate and Immediate Data message and a Send with Invalidate and SE and Immediate Data message, according to one embodiment.

Diagram 750 of FIG. 7b depicts a DDP segment format for a DDP segment in a Send with Invalidate and Immediate Data message variant that includes Send ULP data and that precedes the DDP segment including the immediate data shown in FIG. 6. This format is similar to a conventional Send DDP segment, except for the new RDMAP control field and the Invalidate STag field.

Exemplary iWARP System Architecture

Figure 8:
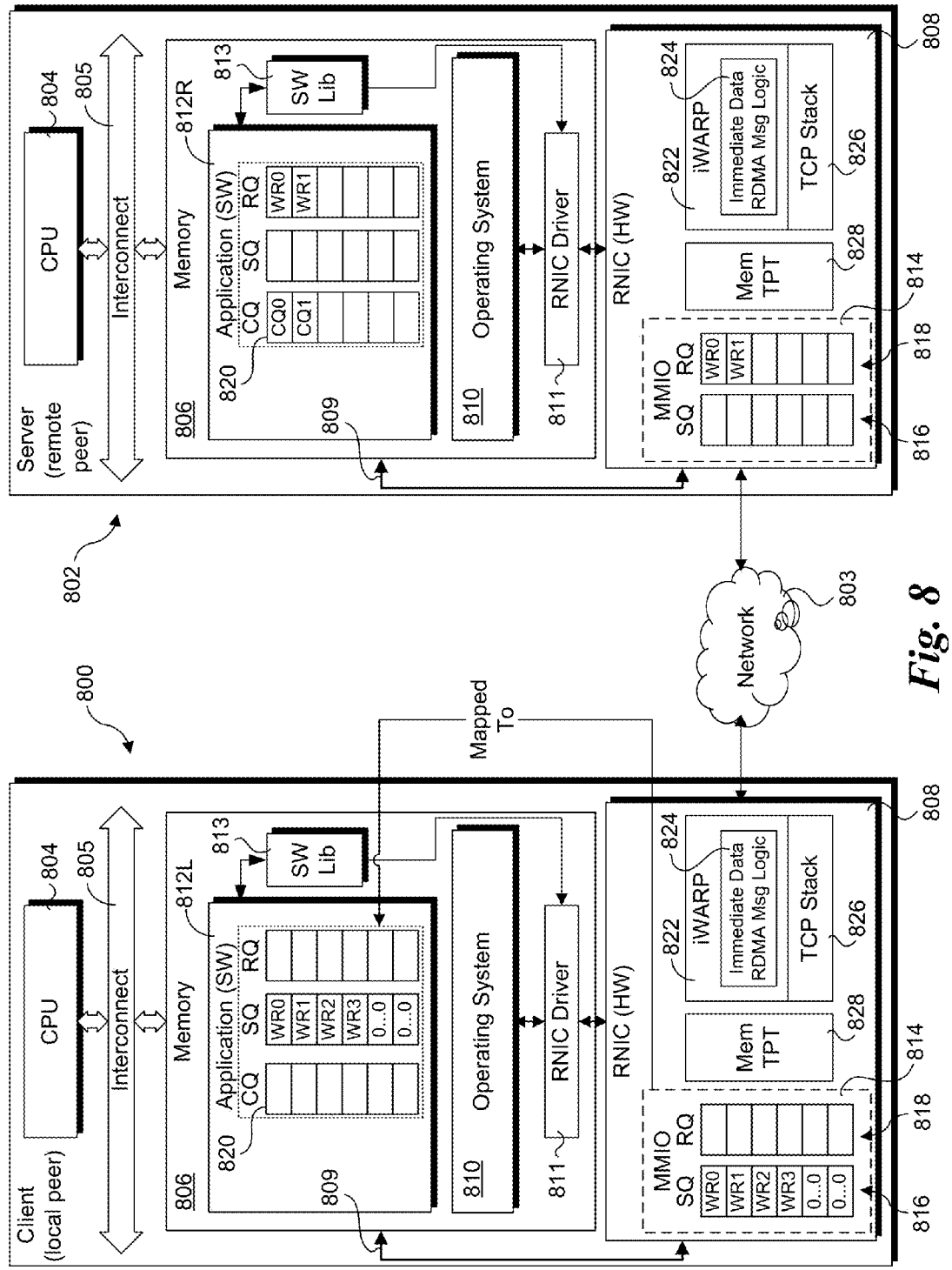
FIG. 8 is a schematic diagram of an exemplary iWARP system architecture illustrating selected components configured to facilitate implementation of iWARP Send with Immediate Data and Send with Immediate Data message variants in accordance with embodiments disclosed herein.

FIG. 8 shows an exemplary iWARP system architecture illustrating selected components configured to facilitate iWARP Send with Immediate Data message variants in accordance with aspects of the embodiments disclosed herein. The system includes a client 800 and a server 802 that are configured to support iWARP data transfers over a network 803 using associated hardware and software components, as described herein. Although depicted as a client and server in FIG. 8, the two illustrated devices may also correspond to a pair of peer machines (e.g., RDMA local and remote peers comprising computers, servers, etc.) that exchange data using RDMA over the iWARP wire protocol. Also, the terms "software" and "hardware" may be generally used herein to refer to operations performed by one or more software components or one or more hardware components, without making explicit reference to any particular software or hardware component. In the illustrated embodiment, each of client 800 and server 802 has a similar configuration, although this is not required. Also depicted for some components is a suffix "L" or "R," which respectively correspond to the Local or Remote RDMA peer; for convenience, these suffixes may or may not be referred to in the discussion below, but rather reference to just the base reference number without the suffix is used.

Client 800 includes a Central Processing Unit (CPU) 804 operatively coupled to system memory 806 via an interconnect 805. In general system memory will be accessed via a memory controller or the like (not shown) that is coupled to interconnect 805, or the memory controller is otherwise operatively coupled to the CPU. In some embodiments, CPU 804 is a multi-core processor with multiple cores including local caches (e.g., L1 and L2 caches), with each core operatively coupled to interconnect 805, which in one embodiment comprises a coherent interconnect that employs a protocol to support memory and cache coherency. In one embodiment, interconnect 805 comprises an Intel® QuickPath™ Interconnect (QPI) that employs the QPI protocol.

Client 800 also includes an RNIC 808 that is operatively coupled to system memory 806 in a manner that enables DMA data transfers between buffers on RNIC 808 and system memory 806. In the illustrated example, this is depicted as being facilitated by an interconnect 809, such as but not limited to a Peripheral Component Interconnect Express (PCIe) interconnect. Although depicted for simplicity as a single interconnect, there may be one or more levels of interconnect hierarchy including applicable interfaces and/or interconnect bridging. For example, in one embodiment, RNIC 808 is operatively coupled to interconnect 805 and is configured to perform DMA operations using the protocol used by interconnect 805.

System memory 806 is used for storing instructions and data relating to various software components, as depicted by an operating system 810, an RNIC driver 811, an RDMA application 812, and a software (SW) library 813. Prior to being loaded into system memory, software instructions and data used to implement the software components are stored on a storage device such as a disk drive or non-volatile memory (not shown). A portion of the memory address space allocated for RDMA application 812 comprises a MMIO address space 814 accessed by RNIC 808. For illustrative purposes, two instances of the same data structures and data are depicted for each of RDMA application 812 and MMIO address space 814; however, it will be recognized that the physical storage for data in the MMIO address space is located in system memory 806 rather than on RNIC 808. At the same time, a portion or portions of the MMIO address space may be cached locally on RNIC 808 under some embodiments.

The MMIO address space includes a Send Queue (SQ) 816 comprising a circular buffer including a plurality of WR entry slots in which Work Request Entries (WREs) are stored, and a Receive Queue (RQ) 818 comprising a circular buffer including a plurality of WR entry slots in which WREs are stored. Other types of buffers may also be used. RDMA application 812 also includes a Completion Queue (CQ) 820 in which Complete Queue Entries (CQEs) are stored.

In the embodiment illustrated in FIG. 8, RNIC 808 includes an iWARP logic block 822 including Immediate Data RDMA message logic 824, and a TCP stack 826. In addition to logic for supporting the new Immediate Data operations, iWARP logic block 822 includes logic for performing both local and remote RDMA peer operations defined in various RDMA specifications, such as the IETF RFC specifications referenced herein. TCP stack 826 is illustrative of lower networking layers configured to facilitate Ethernet communication using the TCP protocol, including a TCP layer, an IP layer, a MAC layer, and a Physical (PHY) layer.

SQ 816 is accessed by both Software (e.g., software library 813) and Hardware (i.e., RNIC 808). Software library 813 is configured to communicate with RNIC driver 811, which provides the software communication interface to RNIC 808. Software library 813 also provides an interface to RDMA application 812 and writes to SQ 816 to post new WRs. Under some embodiments, software library 813 periodically rings a "doorbell" to notify RNIC 808 about new posted WRs. RNIC 808 reads WRs from SQ 816, and processes them.

RNIC 808 also is depicted as including a memory translation and protection table (TPT) 828. The memory TPT, which optionally may be stored in system memory and cached on the RNIC, includes registration entries that are used to translate addresses and validate data that is being transmitted from or placed into registered buffers. For example, memory TPT is configured to receive STag and Tag Offset inputs and map them to corresponding memory addresses.

Send with Immediate Data Operations

The Send with Immediate Data, Send with Invalidate and Immediate Data, Send with Solicited Event and Immediate Data, and Send with Solicited Event and Invalidate and Immediate Data messages follow the same model as described in section 5.3 of RFC 5040 with the following differences. DDP Segments without the L bit set conform to the Send Message format defined in RFC 5040 (untagged DDP Segment). The L bit will be set to 1 only in the DDP Segment that contains immediate data. The only data allowed in the DDP Segment with the L bit set is the immediate data itself. At the data sink, if the operation is completed successfully, the RDMAP Layer passes the 8 bytes of immediate data to the ULP Layer and a completion queue entry containing the immediate data is written.

Figure 9A:
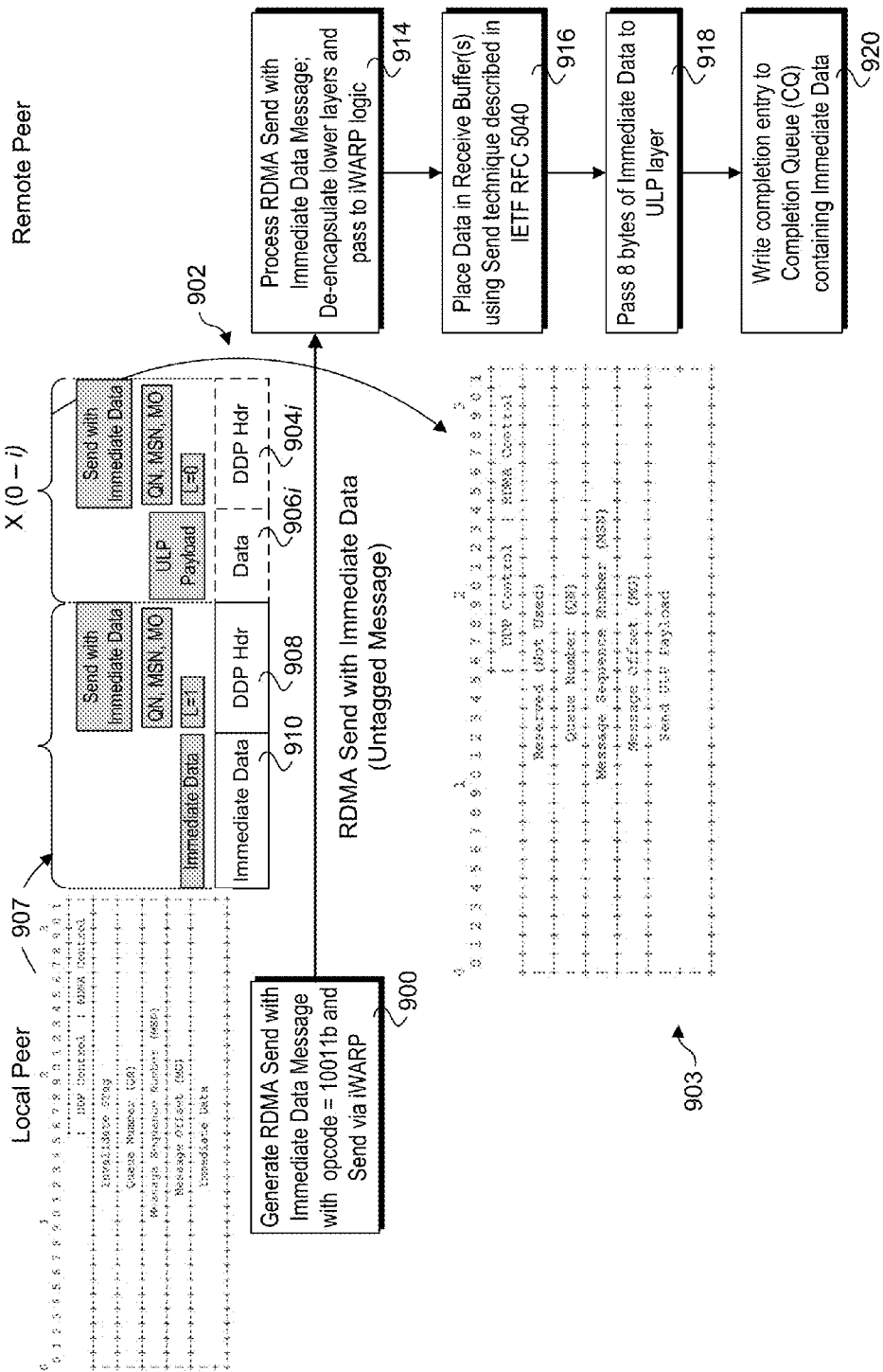
FIG. 9a is a combined message flow and operations diagram illustrating operations performed by RDMA local and remote peers in connection with implementing a Send with Immediate Data message, according to one embodiment.

FIG. 9a is a message flow and operations diagram illustrating implementation of a Send with Immediate Data message, according to one embodiment. The process begins in a block 900, wherein a Send with Immediate Data message 902 is generated using an opcode=01011b in the RDMA control field of the DDP headers. In further detail, the Send with Immediate Data message may include 0-i (zero or more) DDP segments 903 with ULP payloads, each including a DDP header 904i and a Send ULP payload 906i, followed by a DDP Immediate Data segment 907 including a DDP header 908 immediately followed by immediate data 910. The DDP header 904i of each DDP segment 903 is the same as shown in FIG. 7a and includes DDP and RDMAP Control fields, a reserved field, a QN, MSN, and MO fields followed by the Send ULP Payload, while the L-bit of the DDP Control field (see FIG. 3) is set to 0 (i.e., not set). In DDP Immediate Data segment 907, the L-bit is set (i.e., =1), and the Invalidate STag field value is 0 (e.g., 0000 0000 0000 0000b).

Upon receipt at the remote peer, Send with Immediate Data message 902 is processed by the lower layers, with the remaining DDP segments passed to the iWARP logic, as shown in a block 914. In a block 916, for each of the DDP segments 903 (if any), the ULP payload data is extracted and placed in applicable receive buffer(s) at locations derived from the QN, MSN, and MO values using the Send message processing techniques described in IETF RFC 5040, which are well-known to those skilled in the RDMA art.

DDP Immediate Data segment 907 is handled in a different manner than DDP segments containing Send ULP data. In a block 918, the 8 bytes of immediate data are passed to an ULP layer. Additionally, a CQE containing the immediate data is written to the completion queue, as depicted by a block 920.

Figure 9B:
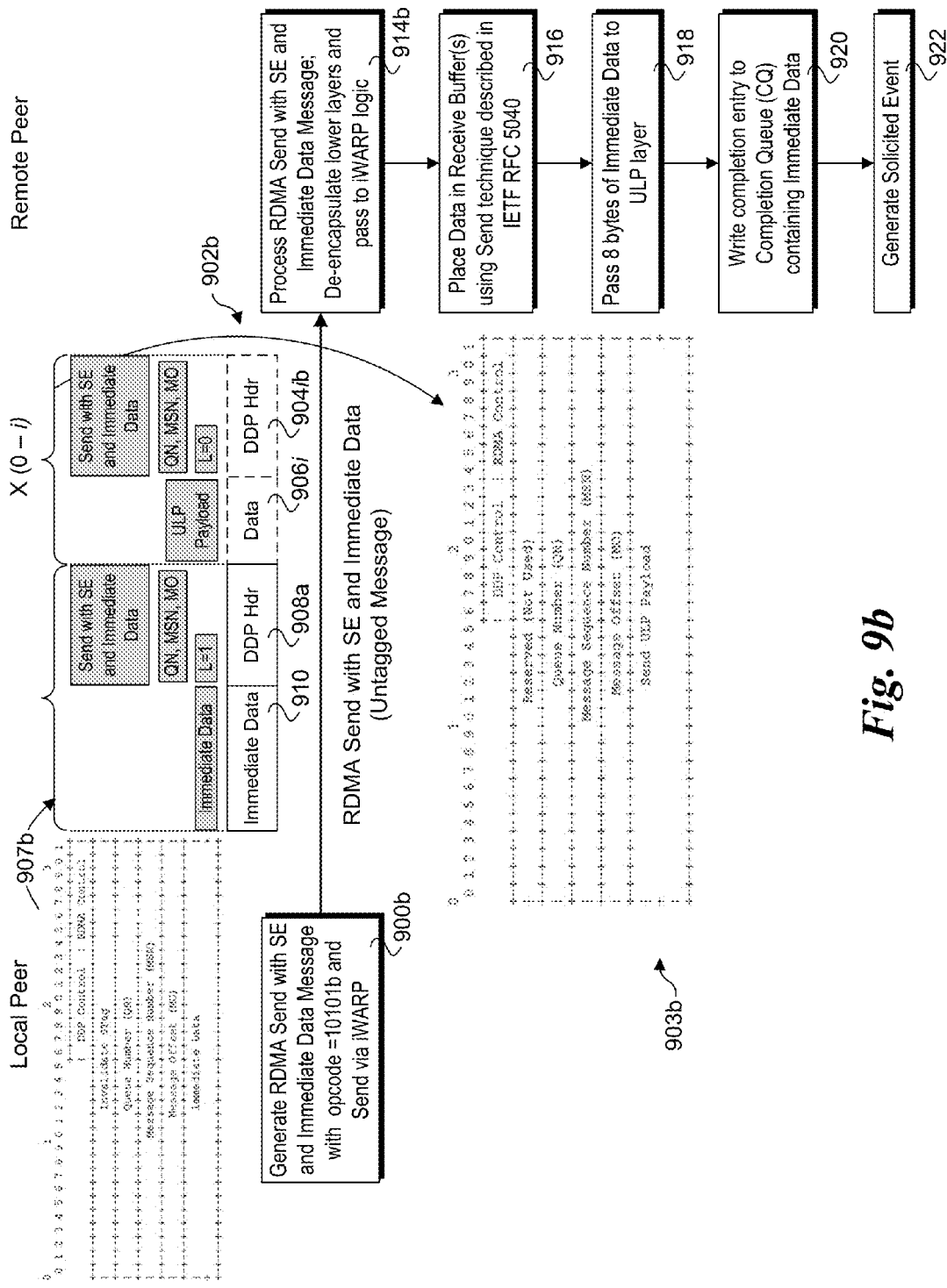
FIG. 9b is a combined message flow and operations diagram illustrating operations performed by RDMA local and remote peers in connection with implementing a Send with SE and Immediate Data message, according to one embodiment.

An exemplary implementation of a Send with SE and Immediate Data message 902b is illustrated in FIG. 9b, wherein the message is generated by the local peer in a block 900b and initially processed at the remote peer in a block 914b. As shown by like-numbered components and processing blocks, the format and processing of Send with SE and Immediate Data message 902b is similar to the format and processing of Send with Immediate Data message 902 shown in FIG. 9a. The differences are the DDP headers 904ib and 908b of the DDP segments 903b with ULP payloads and the DDP Immediate Data segment 907b have a different opcode (=10101b in one embodiment), and that an event is generated in a block 922 if the completion queue is configured to generate solicited events.

Figure 9C:
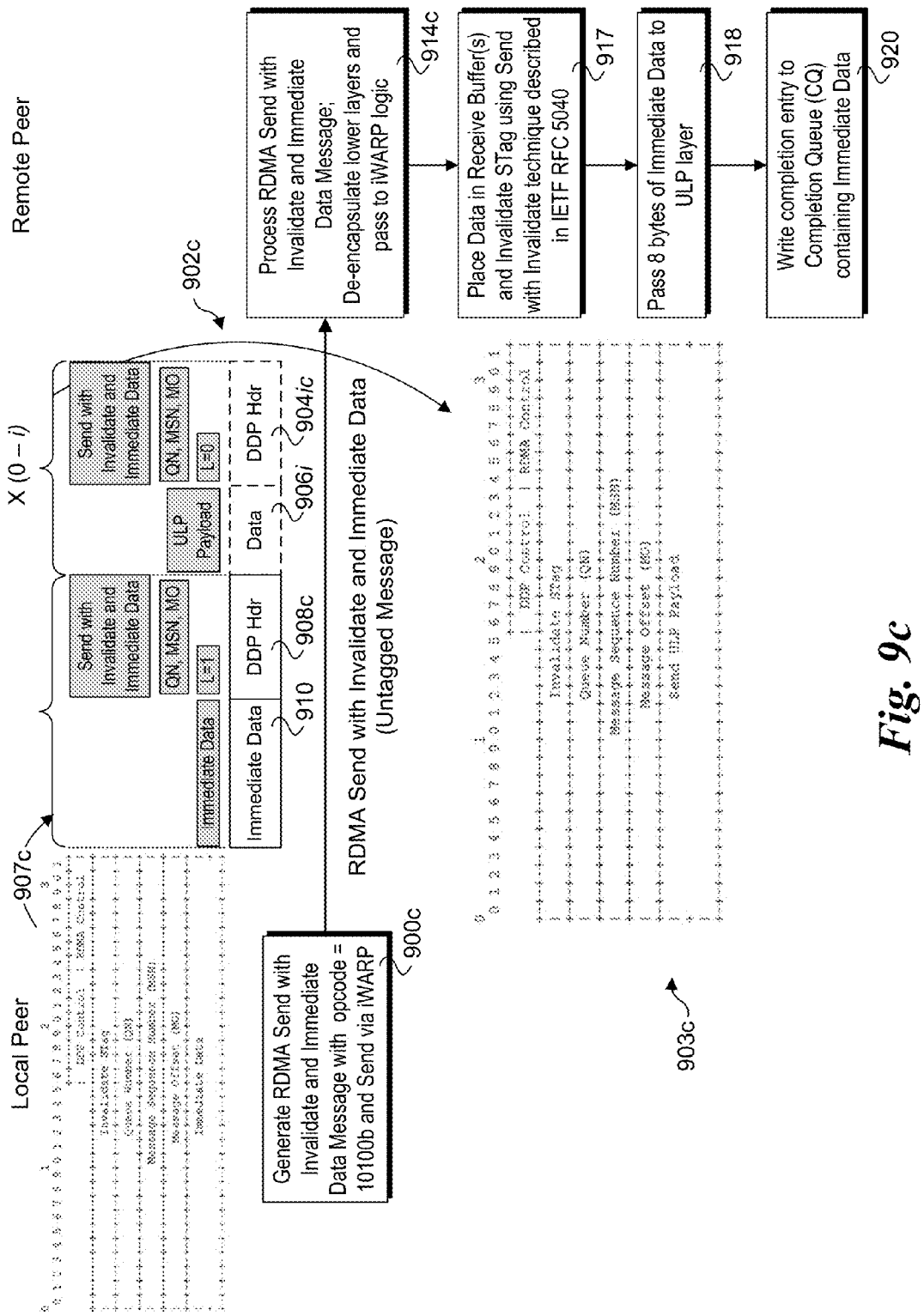
FIG. 9c is a combined message flow and operations diagram illustrating operations performed by RDMA local and remote peers in connection with implementing a Send with Invalidate and Immediate Data message, according to one embodiment.

An exemplary implementation of a Send with Invalidate and Immediate Data message 902c is illustrated in FIG. 9c, wherein the message is generated by the local peer in a block 900c and initially processed at the remote peer in a block 914c. As before, like-numbered components and blocks have similar formats and perform similar operations to those shown in FIGS. 9a and 9b. The differences in the message format is the DDP headers 904ic and 908c of the DDP segments 903c with ULP payloads and the DDP Immediate Data segment 907b have a different opcode (=10100b in one embodiment), and that DDP header 904ic includes an Invalidate STag field in which data identifying an STag to be invalidated is included, similar to that shown in FIG. 7b. Also, the Invalidate STag field of DDP header 908c will contain this same data. During processing at the remote peer, in a block 917, for each of the DDP segments 903c (if any), the ULP payload data is extracted and placed in applicable receive buffer(s) at locations derived from the QN, MSN, and MO values using the Send message processing techniques described in IETF RFC 5040. In addition, the applicable STag is invalidated as described in IETF RFC 5040.

Figure 9D:
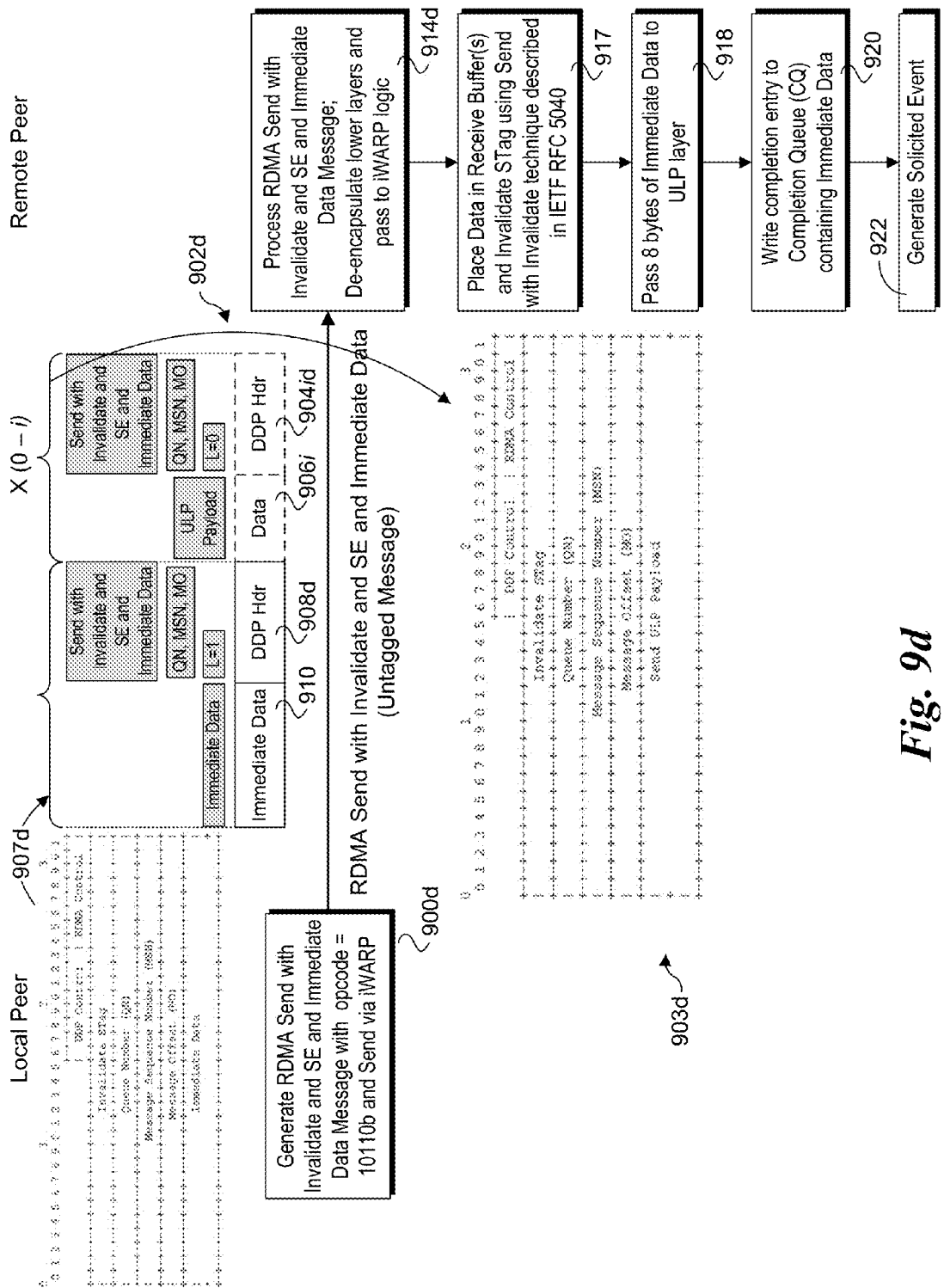
FIG. 9d is a combined message flow and operations diagram illustrating operations performed by RDMA local and remote peers in connection with implementing a Send with Invalidate and SE and Immediate Data message, according to one embodiment.

An exemplary implementation of a Send with Invalidate and SE and Immediate Data message 902d is illustrated in FIG. 9d, wherein the message is generated by the local peer in a block 900d and initially processed at the remote peer in a block 914d. This message format and processing is similar to Send with Invalidate and Immediate Data message 902c, except DDP header 904id and DDP header 908d have an opcode (=10110b in one embodiment) indicating the message further includes a Solicited Event, which is generated in block 922 if the completion queue is configured to generate Solicited Events.

Exemplary RNIC system architecture

Figure 10:
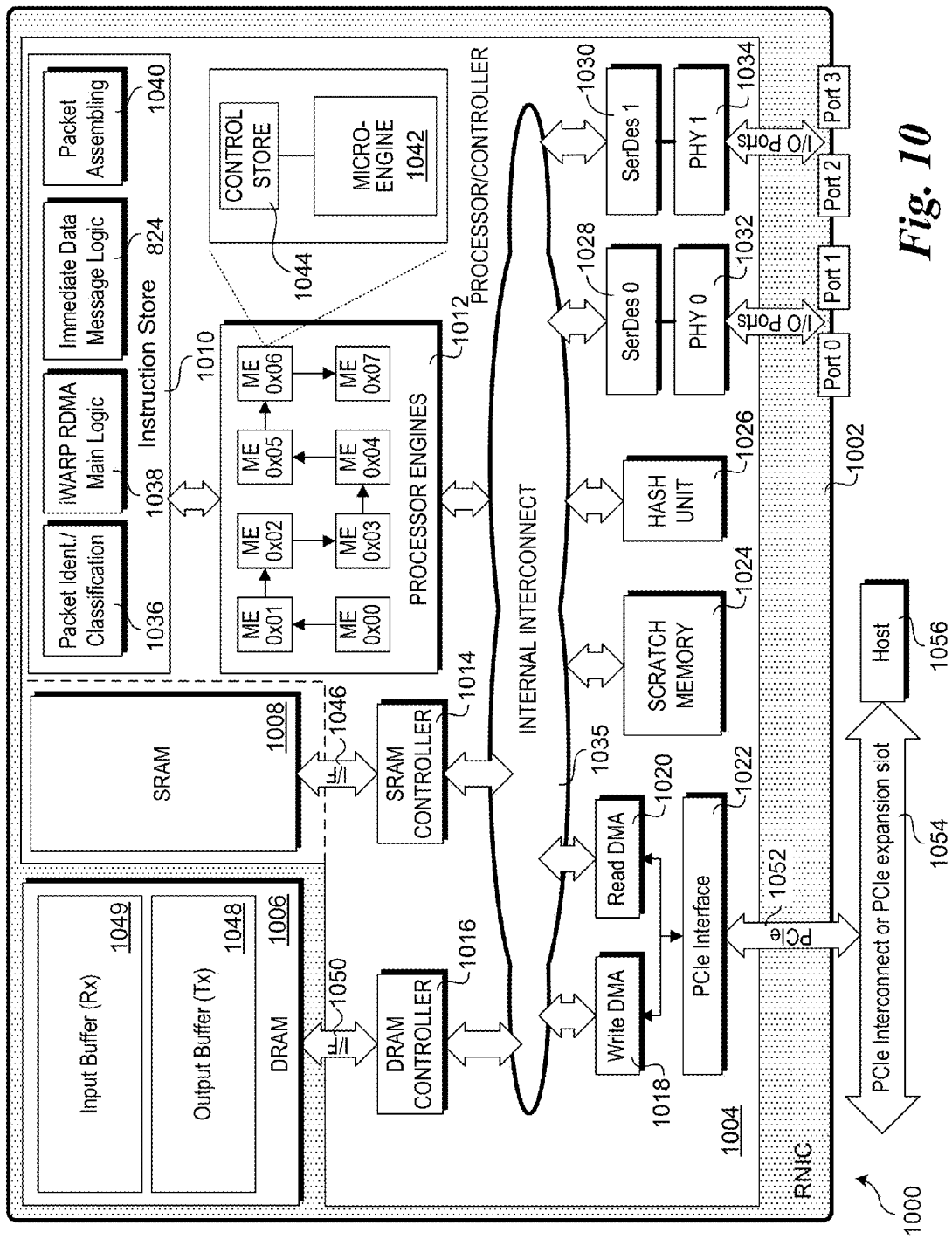
FIG. 10 is a schematic diagram illustrating an RNIC architecture that may be used for implementing aspects of the embodiments disclosed herein.

An exemplary system architecture for an RNIC 1000 that may be configured to implement aspects of the iWARP RNIC embodiments described herein is shown in FIG. 10. RNIC 1000 includes a NIC system board 1002 on which a network processor/controller 1004, and memory comprising Dynamic Random Access Memory (DRAM) 1006 and SRAM 1008 are mounted. In one embodiment, SRAM 1008 is integrated on processor/controller 1004. Under various embodiments. NIC system board 1002 is representative of an Ethernet controller card, a daughter board, a multi-chip module board or substrate, or it may be part of a computer system board, such as a main board or motherboard for a computer server. Processor/controller 1004 is representative of Ethernet processing and/or control unit, and may be embodied in various forms, including as an Ethernet controller chip or a network processor unit (NPU). RNIC functionality may also be implemented via a stand-alone integrated circuit (e.g., a separate chip).

In the illustrated embodiment, processor/controller 1004 includes an instruction store 1010, a cluster of processor engines 1012, an SRAM controller 1014, a DRAM controller 1016, a Write DMA block 1018, a Read DMA block 1020, a PCIe interface 1022, a scratch memory 1024, a hash unit 1026, Serializer/Deserializers (SerDes) 1028 and 1030, and Physical Layer (PHY) interfaces 1032 and 1034. Each of the components is interconnected to one or more other components via applicable interconnect structure and logic that is collectively depicted as an internal interconnect cloud 1035.

Instruction store 1010 includes various instructions that are executed by processor engines cluster 1012, including packet identification/classification instructions 1036, iWARP RDMA main logic 1038, RDMA Read V2 message logic 824 and packet assembling logic 1040. Processor engines cluster 1012 includes a plurality of microengines 1042, each coupled to a local control store 1044. Under one embodiment, various operations such as packet identification and classification are performed using a pipelined architecture, such as illustrated in FIG. 10, with each microengine performing an associated operation in the pipeline. As an alternative, processor engines cluster 1012 is representative of one or more processor cores in a central processing unit or controller. As yet another option, the combination of processor engines 1012 and instruction store 1010 may be implemented as embedded logic, such as via a Field Programmable Gate Array (FPGA) or the like, or through other embedded logic circuitry.

In one embodiment, instruction store 1010 is implemented as an on-chip store, such as depicted in FIG. 10. Optionally, a portion or all of the instructions depicted in instruction store 1010 may stored in SRAM 1008 (if off-chip) and accessed using SRAM controller 1014 via an interface 1046. SRAM 1008 may also be used for storing selected data and/or instructions relating to packet processing operations, as well as cache page table entries.

DRAM 1006 is used to for implementing one or more Input Buffers 1049 and one or more Output Buffers 1048, and is accessed using DRAM controller 1016 via an interface 1050. Optionally, all or a portion of an RNIC's input and output buffers may be integrated on an RNIC chip or on a separate PHY chip. Write DMA block 1018 and Read DMA block 1020 are respectively configured to support DMA Write and Read operations in accordance with the embodiments described herein. In the illustrated embodiment, DMA communication between DRAM 1006 and a platform host circuitry is facilitated over PCIe interface 1022 via a PCIe link 1052 coupled to a PCIe interconnect or PCIe expansion slot 1054, enabling DMA Write and Read transfers between DRAM 1006 and system memory for a host 1056 using the PCIe protocol. However, the use of PCIe is merely exemplary and not limiting, as other interconnect architectures and protocols may be used.

Scratch memory 1024 and hash unit 1026 are illustrative of components employed by NICs for facilitating scratch memory and hashing operations relating to packet processing. For example, a hash operation may be implemented for deriving flow IDs and for packet identification.

PHYs 1032 and 1034 facilitate Physical layer operations for the RNIC, and operate as a bridge between the digital domain employed by the RNIC logic and components and the analog domain employed for transmitting data via electrical, optical or wired signals. For example, in the illustrated embodiment of FIG. 10, each of PHYs 1032 and 1034 is coupled to a pair of I/O ports configured to send electrical signals over a wire cable such as a Cat5e, Cat6, or Cat7 cable. Optical and wireless signal embodiments would employ additional circuitry and interfaces for facilitating connection via optical and wireless signals (not shown). In conjunction with PHY operations, SerDes 1028 and 1030 are used to serialize output packet streams and deserialize inbound packet streams. Although four ports (0-3) are shown, an RNIC may have other number of ports.

In addition to the instructions shown in instruction store 1010, other instructions may be implemented via execution of processor engines 1012 or other processing means to facilitate additional operations. For example, in one embodiment, NIC 1000 is configured to implement a TCP/IP stack on the RNIC itself, as illustrated by TCP stack 826 in FIG. 8 and discussed above. RNIC 1000 may also be configured to facilitate TCP operations in a manner that is offloaded from the Operating System TCP facilities, whereby once a packet is sent outbound, RNIC 1000 is responsible for processing an ACK message and resending the packet if an ACK message is not received within an applicable TCP timeout period.

RDMA main logic 1036 comprises instructions and logic for facilitating RDMA data transfer operations, which may include conventional RDMA operations. Immediate Data Message Logic Read V2 message logic 824 includes logic for generating and processing the various RDMA Immediate Data message embodiments and operations (including the Send Immediate Data variants) described herein. Although depicted as separate blocks for illustrative and discussion purposes, the various instructions in instruction store 1010 may logically be divided into a greater or lesser number of blocks or modules, or may be implemented as a single iWARP RDMA embedded application.

In addition to support for iWARP RDMA operations, an RNIC may be configured perform conventional NIC operations, including operations relating to packet forwarding. Accordingly, RNIC 1000 may be configured to store data for facilitating packet identification and classification, including forwarding filters and rules either locally or using a Memory-Mapped IO (MMIO) address space in system memory. When stored locally, this data may be stored in either DRAM 1006 or SRAM 1008. Data stored in a MMIO address space may be accessed by RNIC 1000 via Read DMA operations. Generally, setting up MMIO address space mapping may be facilitated by an RNIC device driver in coordination with the operating system. The RNIC device driver may also be configured to enable instructions in instruction store 1010 to be updated via the operating system. Optionally, the instructions in instruction store may comprise firmware instructions that are stored in non-volatile memory, such as Flash memory, which may either be integrated on processor/controller 1004 or mounted to NIC system board 1002 (not shown).

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Also, aspects of some embodiments may be implemented via software-based components, such as but not limited to RNIC driver 711, software library 713, and software application 712. Thus, embodiments of this invention may be used as or to support a software program, modules, components, etc., executed upon some form of processing core (such as the CPU of a computer) or otherwise implemented or realized upon or within a non-transient machine-readable medium. A machine-readable medium includes any mechanism for storing information in a form readable by a machine (e.g., a computer). For example, a machine-readable medium may include a read only memory (ROM); a random access memory (RAM); a magnetic disk storage media; an optical storage media; and a flash memory device, etc.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software running on a server or firmware executed by an embedded processor on a network element. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus, comprising:
    an Ethernet network interface, configured to send and receive packetized data over an Ethernet Network; and
    Internet Wide Area Remote Direct Memory Access Protocol (iWARP) logic, configured to facilitate operations when the apparatus is operating including,
        generating a plurality of different types of Remote Direct Memory Access (RDMA) Send with Immediate Data message variants; and
        sending the Send with Immediate Data messages outbound from the Ethernet network interface to an RDMA remote peer using iWARP,
    wherein one type of Send with Immediate Data message comprises a Send with Immediate Data message including a DDP segment having a DDP header containing an opcode in an RDMA Control field indicating the message is a Send with Immediate Data message and including a field immediately following the DDP header containing immediate data, and
    wherein one type of Send with Immediate Data message comprises a Send with Invalidate and Immediate Data message including a DDP segment having a DDP header containing an opcode in an RDMA Control field indicating the message is a Send with Invalidate and Immediate Data message and a field containing data identifying a Steering Tag (STag) to invalidate, and including a field immediately following the DDP header containing immediate data.

2. The apparatus of claim 1, wherein one type of Send with Immediate Data message comprises a Send with Solicited Event (SE) and Immediate Data message including a DDP segment having a DDP header containing an opcode in an RDMA Control field indicating the message is a Send with SE and Immediate Data message, and including a field immediately following the DDP header containing immediate data.

3. The apparatus of claim 1, wherein one type of Send with Immediate Data message comprises a Send with Invalidate and Solicited Event (SE) and Immediate Data message including a DDP segment having a DDP header containing an opcode in an RDMA Control field indicating the message is a Send with Invalidate and SE and Immediate Data message and a field containing data identifying a Steering Tag (STag) to invalidate, and including a field immediately following the DDP header containing immediate data.

4. The apparatus of claim 1, wherein the plurality of Send with Immediate Data messages are configured to support transfer of data over an Ethernet link using one or more DDP Segments, and an only or last DDP Segment includes a DDP header containing an opcode identifying the type of Send with Immediate Data message and an L bit set to 1, and the DDP Segment includes 8 bytes of immediate data following the DDP header.

5. The apparatus of claim 4, wherein the DDP header includes an RDMA protocol (RDMAP) control field, and the opcode identifying the type of Send with Immediate Data message is included in the RDMAP control field.

6. The apparatus of claim 1, wherein the iWARP logic is further configured to facilitate operations when the apparatus is operating including,
processing Send with Immediate Data messages received at the Ethernet network interface from an RDMA remote peer;
for each received Send with Immediate Data message,
passing the immediate data contained in the message to an Upper Layer Protocol (ULP) layer; and
writing a completion queue entry containing the immediate data to a completion queue.

7. The apparatus of claim 6, wherein the iWARP logic is further configured to facilitate operations when the apparatus is operating including,
in response to receiving a Send with Immediate Data message variant that includes at least one DDP segment containing Send ULP payload data,
inspecting data identifying a Queue Number (QN), Message Sequence Number (MSN), and Message Offset (MO) contained in a DDP header of the DDP segment; and
placing the Send ULP payload data in a buffer that is located using the QN, MSN, and MO data.

8. The apparatus of claim 7, wherein the Send with Immediate message comprises one of a Send with Invalidate and Immediate Data message or a Send with Invalidate and Solicited Event (SE) and Immediate Data message and includes data identifying a Steering Tag (STag) to invalidate, and the iWARP logic is further configured to facilitate operations when the apparatus is operating including invalidating the STag that is identified.

9. The apparatus of claim 7, wherein a DDP segment containing Send ULP data has a DDP header including an RDMA protocol (RDMAP) control field, and the opcode identifying the type of Send with Immediate Data message is included in the RDMAP control field.

10. The apparatus of claim 7, wherein the Immediate Data message includes a Solicited Event, and the iWARP logic is further configured to facilitate operations when the apparatus is operating including generating an event if a completion queue is configured to generate Solicited Events.

11. The apparatus of claim 1, wherein the apparatus comprises an iWARP RDMA Network Interface Controller (RNIC).

12. A method comprising:
generating a plurality of different types of Internet Wide Area Remote Direct Memory Access (RDMA) Protocol (iWARP) Send with Immediate Data message variants; and
sending the Send with Immediate Data messages outbound from an Ethernet network interface to an RDMA remote peer,
wherein one type of Send with Immediate Data message comprises a Send with Immediate Data message including a DDP segment having a DDP header containing an opcode in an RDMA Control field indicating the message is a Send with Immediate Data message and including a field immediately following the DDP header containing immediate data, and
wherein one type of Send with Immediate Data message comprises a Send with Invalidate and Immediate Data message including a DDP segment having a DDP header containing an opcode in an RDMA Control field indicating the message is a Send with Invalidate and Immediate Data message and a field containing data identifying a Steering Tag (STag) to invalidate, and including a field immediately following the DDP header containing immediate data.

13. The method of claim 12, wherein one type of Send with Immediate Data message comprises a Send with Solicited Event (SE) and Immediate Data message including a DDP segment having a DDP header containing an opcode in an RDMA Control field indicating the message is a Send with SE and Immediate Data message, and including a field immediately following the DDP header containing immediate data.

14. The method of claim 12, wherein one type of Send with Immediate Data message comprises a Send with Invalidate and Solicited Event (SE) and Immediate Data message including a DDP segment having a DDP header containing an opcode in an RDMA Control field indicating the message is a Send with Invalidate and SE and Immediate Data message and a field containing data identifying a Steering Tag (STag) to invalidate, and including a field immediately following the DDP header containing immediate data.

15. The method of claim 12, wherein the plurality of Send with Immediate Data messages are configured to support transfer of data over an Ethernet link using one or more DDP Segments, and an only or last DDP Segment includes a DDP header containing an opcode identifying the type of Send with Immediate Data message and an L bit set to 1, and the DDP Segment includes 8 bytes of immediate data following the DDP header.

16. The method of claim 15, wherein the DDP header includes an RDMA protocol (RDMAP) control field, and the opcode identifying the type of Send with Immediate Data message is included in the RDMAP control field.

17. The method of claim 12, further comprising:
receiving Send with Immediate Data messages at the Ethernet network interface from an RDMA remote peer;
for each received Send with Immediate Data message,
passing the immediate data contained in the message to an Upper Layer Protocol (ULP) layer; and
writing a completion queue entry containing the immediate data to a completion queue.

18. The method of claim 17, further comprising:
in response to receiving a Send with Immediate Data message that includes at least one DDP segment containing ULP payload data,
inspecting data identifying a Queue Number (QN), Message Sequence Number (MSN), and Message Offset (MO) contained in a DDP header of the DDP segment; and
placing the ULP payload data in a buffer that is located using the QN, MSN, and MO data.

19. The method of claim 18, wherein the Send with Immediate Data message comprises one of a Send with Invalidate and Immediate Data message or a Send with Invalidate and Solicited Event (SE) and Immediate Data message and includes data identifying a Steering Tag (STag) to invalidate, and the iWARP logic is further configured to facilitate operations when the apparatus is operating including invalidating the STag that is identified.

20. The method of claim 17, wherein the Send with Immediate Data message includes a Solicited Event, and the iWARP logic is further configured to facilitate operations when the apparatus is operating including generating an event if a completion queue is configured to generate Solicited Events.

21. The method of claim 17, wherein a DDP segment containing Send ULP data has a DDP header including an RDMA protocol (RDMAP) control field, and the opcode identifying the type of Send with Immediate Data message is included in the RDMAP control field.

22. A system comprising:
a processor comprising a plurality of cores;
system memory, operatively coupled to the processor;
a Peripheral Component Interconnect Express (PCIe) interconnect, operatively coupled to the system memory;
a Remote Direct Memory Access (RDMA) Network Interface Controller (RNIC), operatively coupled to the PCIe interconnect and configured to support Direct Memory Access (DMA) operations under which data is written to and read from system memory using DMA data transfers over the PCIe interconnect, the RNIC further including,
an Ethernet network interface, configured to send and receive packetized data over an Ethernet Network; and
Internet Wide Area RDMA Protocol (iWARP) logic, configured to facilitate operations when the system is operating including,
generating a plurality of different types of Send with Immediate Data message variants; and
sending the Send with Immediate Data messages outbound from the Ethernet network interface to an RDMA remote peer using iWARP,
wherein one type of Send with Immediate Data message comprises a Send with Immediate Data message including a DDP segment having a DDP header containing an opcode in an RDMA Control field indicating the message is a Send with Immediate Data message and including a field immediately following the DDP header containing immediate data, and
wherein one type of Send with Immediate Data message comprises a Send with Invalidate and Immediate Data message including a DDP segment having a DDP header containing an opcode in an RDMA Control field indicating the message is a Send with Invalidate and Immediate Data message and a field containing data identifying a Steering Tag (STag) to invalidate, and including a field immediately following the DDP header containing immediate data.

23. The system of claim 22, wherein the plurality of different types of Send with Immediate Data messages include:
a Send with Immediate Data message;
a Send with Invalidate and Immediate Data message;
a Send with SE and Immediate Data message; and
a Send with Invalidate and SE and Immediate Data message.

24. The system of claim 23, wherein:
the Send with Immediate Data message has an RDMA Message opcode of 10011b;
the Send with Invalidate and Immediate Data message has an RDMA Message opcode of 10100b;
the Send with Solicited Event SE and Immediate Data message has an RDMA Message opcode of 10101b; and,
the Send with Invalidate and SE and Immediate Data message that has an RDMA Message opcode of 10110b.

25. The system of claim 22, wherein the iWARP logic is configured to perform further operations including:
processing Send with Immediate Data messages received at the Ethernet network interface from an RDMA remote peer;
for each received Send with Immediate Data message,
passing the immediate data contained in the message to an Upper Layer Protocol (ULP) layer; and
writing a completion queue entry containing the immediate data to a completion queue.

26. The system of claim 25, wherein the iWARP logic is configured to perform further operations including:
inspecting a DDP header of each Send with Immediate Data message received at the Ethernet network interface to identify an RDMA opcode; and
processing the Send with Immediate Data message according to a type of Send with Immediate Data message identified by the RDMA opcode.

* * * * *